W. P. HAMMOND.
BUMPER FOR AUTOMOBILES.
APPLICATION FILED MAY 22, 1916.

1,276,211.  Patented Aug. 20, 1918.

William P. Hammond
INVENTOR.

UNITED STATES PATENT OFFICE.

WILLIAM P. HAMMOND, OF PASSAIC, NEW JERSEY.

BUMPER FOR AUTOMOBILES.

1,276,211. Specification of Letters Patent. Patented Aug. 20, 1918.

Application filed May 22, 1916. Serial No. 99,087.

*To all whom it may concern:*

Be it known that I, WILLIAM P. HAMMOND, a citizen of the United States, residing at Passaic, county of Passaic, and State of New Jersey, have invented certain new and useful Improvements in Bumpers for Automobiles, of which the following is a specification.

The present invention relates to a bumper for automobiles, and has for its object to provide a device of this character which embodies novel features of construction whereby it can be readily applied to such motor vehicles as the well-known Ford automobile, said vehicles being characterized by the absence of any forwardly projecting knuckles and by a front body bolster and semi-elliptic spring centrally united and both disposed in the vertical plane of the front axle, the ends of the body bolster being connected to the forward extremities of the side bars of the main frame, and having the radiator mounted thereon.

Further objects of the invention are to provide an automobile bumper of this character which can be easily and quickly mounted upon the vehicle without necessitating any changes in the construction thereof, which obtains a firm bearing upon the frame of the automobile so as to successfully resist any shocks to which the device may be subjected when in use, and which does not interfere in any manner with the proper functioning of any of the mechanism of the vehicle.

With these and other objects in view, the invention consists in certain novel combinations and arrangements of the parts as will more fully appear as the description proceeds, the novel features thereof being pointed out in the appended claims.

For full understanding of the invention, reference is to be had to the following description and accompanying drawing, in which:—

Corresponding and like parts are referred to in the following description and indicated in all the views of the drawings by the same reference characters.

Figure 1:
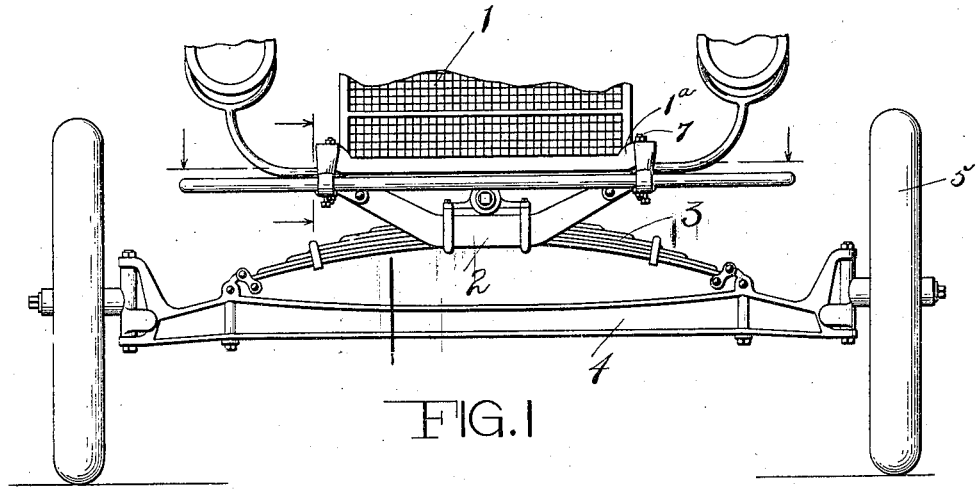
Figure 1 is a front elevation of the forward end of a Ford automobile having the improved bumper applied thereto, the upper portion of the machine being broken away.
Figure 2:
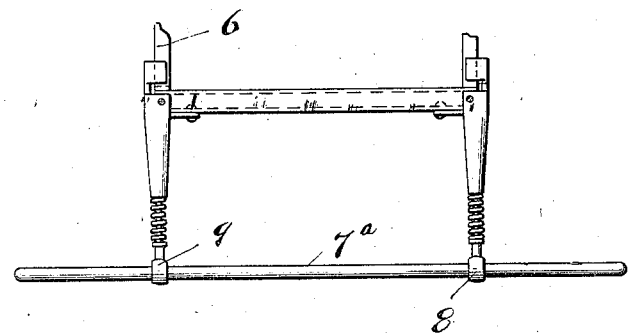
Fig. 2 is a top plan view of the bumper and fragmentary portions of the automobile frame.

For the purpose of illustration the bumper is shown as applied to an automobile of the Ford type, the numeral 1 designating the radiator, 2 the front body bolster, 3 the semi-elliptic front spring which has the ends thereof suitably articulated to the front axle 4, and 5 the front wheels. The extremities of the front body bolster 2 are connected to the forward ends of the side bars 6 of the main frame, and the base of the radiator 1 is formed with laterally projecting lugs 1ª which are secured by the usual bolts 7 to the vehicle frame, this being the conventional and well-known construction.

Figure 3:
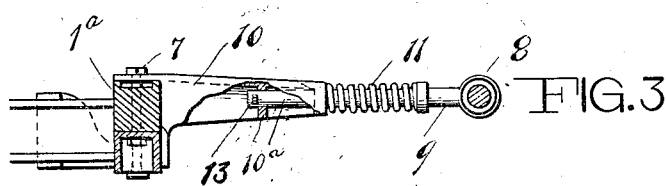
Fig. 3 is a longitudinal vertical sectional view through the bumper, portions being broken away and shown in section, and fragmentary portions of the automobile frame being shown.
Figure 4:
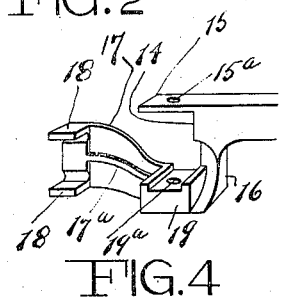
Fig. 4 is a detached perspective view of the rear end of one of the bumper arms.

The transversely extending bumper bar 7ª is suitably secured, as by means of the rings 8, to the forward extremities of plungers 9 which are slidably mounted upon bumper arms 10, one of which projects forwardly from each side of the vehicle frame. As indicated more clearly by Fig. 3. these bumper arms 10 may have a hollow or channel formation and be provided with an interior partition 10ª for slidably engaging the plungers 9. Coil springs 11 are shown as surrounding the plungers 9 and interposed between shoulders 12 thereon and the forward extremities of the arms 10. Transverse pins 13 extending through suitable openings in the ends of the plungers 9 limit the outward movement of the plungers and prevent them from being withdrawn from position. The springs 11 operate in the usual manner to provide a cushioning means to absorb ordinary shocks and jars, the plungers 9 and bumper bar 7 being free to move rearwardly a limited amount against the action of the springs 11.

The rear end of each of the arms 10 terminates in a shoulder 14 which is adapted to abut against the front of the vehicle frame and to take the direct thrusts upon the bumper. A tang 15 extends rearwardly from the top of the arm 10 and fits over the top of the corresponding radiator lug 1ª, being formed with an opening 15ª which is adapted to receive the bolt 7. An arm 16 projects downwardly from the rear end of the bumper arm 10, the lower end thereof being connected to a plate or arm 17 which extends rearwardly along the exterior of the corresponding side bar 6, the extremity of the rearwardly extending arm being provided at the top and bottom thereof with laterally projecting flanges 18 which fit over the top and bottom respectively of the side bar 6. A block 19 is provided at the intersection of the two arms 16 and 17, said block projecting laterally and being adapted to fit accurately within the corresponding extremity of the front body bolster 2 which has a channel formation. This block 19 is perforated at 19ª for engagement with the same bolt 7 which passes through the radiator lug 1ª and the before mentioned tang 15. The upper face of the block 19 may be channeled to insure a firm bearing against the lower face of the body bolster 2, and the rearwardly extending arm 17 may be reinforced by a rib 17ª. The flanges 18 at the extremity of the rearwardly extending arm or side plate 17 fit over the top and bottom of the side bar 6 of the main frame and securely lock the bumper supporting arm 10 against any vertical swinging movement. The said bumper bar supporting arms 10 are thus held firmly in position with the shoulders 14 at the rear ends thereof abutting squarely against the main vehicle frame, so that any reasonable or ordinary amount of thrust can be resisted without resulting in any injury to the vehicle or any of the mechanism thereon.

Having thus described the invention, what I claim as new and desire to secure by Letters Patent, is:—

1. A bumper supporting arm for use in connection with automobiles having a main frame which includes a transverse front body bolster and side bars connected to the extremities thereof and having a radiator formed with side lugs which are secured to the frame, said supporting arm terminating at the rear end thereof in a shoulder adapted to fit squarely against the front of the automobile frame, a downwardly extending arm being provided in alinement with the shoulder for obtaining an extended bearing upon the frame, and a side plate and top tang being provided, a top tang fitting over a side lug of the radiator, while the side plate extends along a side bar of the main frame.

2. A bumper supporting arm for use in connection with automobiles having a main frame which includes a transverse channel shaped front body bolster and side bars connected to the ends thereof, said arm terminating at the rear end thereof in a shoulder adapted to fit squarely against the front of the bolster, a downwardly extending arm being provided in the plane of the shoulder for obtaining an extended bearing upon the bolster, and a side plate being also provided, the side plate fitting tightly against a side bar of the main frame, while the downwardly extending arm terminates in means for positively engaging the edge of the channel shaped bolster.

3. A bumper supporting arm for use in connection with automobiles having a main frame which includes a transverse channel shaped front body bolster and side bars connected to the ends thereof, and also having a radiator frame formed with side lugs, said supporting arm terminating at the rear end thereof in a shoulder adapted to fit squarely against the bolster and having a downwardly extending arm in the plane of the shoulder to obtain an extended bearing upon the bolster, a side plate and an upper tang being also provided at the rear end of the arm, the tang fitting over a side lug of the radiator, while the side plate extends along a side bar of the main frame and is provided with a lateral wing for engagement with an edge of the side bar, the downwardly extending arm being provided at its end with means for positively engaging the edge of the channel shaped bolster.

4. A bumper supporting arm for use in connection with automobiles having a main frame which includes a transverse channel shaped front body bolster and side bars connected to the ends thereof, and also having a radiator frame formed with side lugs, said supporting arm terminating at its rear end in a shoulder adapted to fit squarely against the bolster, a downwardly projecting arm being provided in the plane of the shoulder for obtaining an extended bearing upon the bolster, and an upper tang and a side plate being also provided, the tang fitting over a side lug of the radiator while the side plate extends rearwardly from the lower end of the downwardly extending arm and fits against the side bar of the frame, an integral block being formed at the intersection of the arm and side plate for fitting in the channel shaped front body bolster.

WILLIAM P. HAMMOND.